US011302084B2

(12) United States Patent
Constantinides

(10) Patent No.: US 11,302,084 B2
(45) Date of Patent: Apr. 12, 2022

(54) VIRTUAL WORK OF EXPRESSION WITHIN A VIRTUAL ENVIRONMENT

(71) Applicant: Stephen Constantinides, Baltimore, MD (US)

(72) Inventor: Stephen Constantinides, Baltimore, MD (US)

( * ) Notice: Subject to any disclaimer, the term of this patent is extended or adjusted under 35 U.S.C. 154(b) by 0 days.

(21) Appl. No.: 17/063,635

(22) Filed: Oct. 5, 2020

(65) Prior Publication Data

US 2021/0174595 A1 Jun. 10, 2021

Related U.S. Application Data

(63) Continuation of application No. 16/252,706, filed on Jan. 20, 2019, now Pat. No. 10,796,491, which is a continuation of application No. 15/587,128, filed on May 4, 2017, now Pat. No. 10,210,665, which is a continuation of application No. 15/007,162, filed on Jan. 26, 2016, now abandoned.

(Continued)

(51) Int. Cl.
*G06T 19/00* (2011.01)
*G06K 9/00* (2022.01)

(52) U.S. Cl.
CPC ........ *G06T 19/006* (2013.01); *G06K 9/00302* (2013.01)

(58) Field of Classification Search
CPC .......................... G06T 19/006; G09G 2380/14
USPC ........................................................ 345/433
See application file for complete search history.

(56) References Cited

U.S. PATENT DOCUMENTS

| 8,738,039 B2 | 5/2014 | Forstall et al. |
| 8,788,973 B2 | 7/2014 | Lavigne et al. |

(Continued)

FOREIGN PATENT DOCUMENTS

| KR | 1020160078703 | 7/2016 |
| WO | 2015021200 A1 | 2/2015 |
| WO | 2017120660 A1 | 7/2017 |

OTHER PUBLICATIONS

Behzadan, A. et al., 2012. A Framework for Utilizing Context-Aware Augmented Reality Visualization in Engineering Education, 12th International Conference on Construction Application of Virtual Reality,Taipei, Taiwan, 292-299.

(Continued)

*Primary Examiner* — Thomas J Lett
(74) *Attorney, Agent, or Firm* — Redbrick IP, P.C.

(57) ABSTRACT

A system and method for displaying a virtual three-dimensional environment, including: displaying at least a portion of the virtual three-dimensional environment in a head-mounted display, where the head-mounted display includes a retinal tracking device; enabling a user to interact with the virtual three-dimensional environment; displaying a virtual representation of a written work within the virtual three-dimensional environment in the head-mounted display; enabling the user to interact with the virtual representation of the written work; tracking the user's reading position in the representation of the written work via the retinal tracking device; determining the content of the representation of the written book at the user's reading position; and modifying the virtual three-dimensional environment based at least in part on the content at the user's reading position.

20 Claims, 4 Drawing Sheets

Related U.S. Application Data

(60) Provisional application No. 62/109,533, filed on Jan. 29, 2015, provisional application No. 62/107,313, filed on Jan. 23, 2015.

(56) References Cited

U.S. PATENT DOCUMENTS

| | | | |
|---|---|---|---|
| 9,183,807 B2 | 11/2015 | Small et al. | |
| 9,509,787 B2 | 11/2016 | Li | |
| 9,613,003 B1 | 4/2017 | Goodspeed | |
| 9,633,695 B2 | 4/2017 | Axen et al. | |
| 9,712,587 B1 | 7/2017 | Alfishawi et al. | |
| 9,715,482 B1 | 7/2017 | Bjorkegren | |
| 9,826,345 B2 | 11/2017 | Haro et al. | |
| 10,387,574 B1 | 8/2019 | Anders et al. | |
| 10,902,395 B1* | 1/2021 | Knas | G06Q 20/123 |
| 2003/0052900 A1* | 3/2003 | Card | G06F 3/0483 345/660 |
| 2007/0147654 A1 | 6/2007 | Clatworthy et al. | |
| 2007/0226063 A1 | 9/2007 | Hanson | |
| 2008/0215994 A1 | 9/2008 | Harrison et al. | |
| 2008/0222295 A1 | 9/2008 | Robinson et al. | |
| 2008/0288406 A1 | 11/2008 | Seguin et al. | |
| 2010/0131366 A1 | 5/2010 | Gibson et al. | |
| 2010/0164957 A1 | 7/2010 | Lindsay et al. | |
| 2010/0180029 A1 | 7/2010 | Fourman | |
| 2010/0305855 A1 | 12/2010 | Dutton et al. | |
| 2011/0238762 A1 | 9/2011 | Soni et al. | |
| 2011/0238763 A1 | 9/2011 | Shin et al. | |
| 2011/0246910 A1 | 10/2011 | Moxley et al. | |
| 2012/0135784 A1 | 5/2012 | Lee et al. | |
| 2012/0143963 A1 | 6/2012 | Kennberg et al. | |
| 2013/0060873 A1 | 3/2013 | Gautam et al. | |
| 2013/0066963 A1 | 3/2013 | Odio et al. | |
| 2013/0072235 A1 | 3/2013 | Forstall et al. | |
| 2013/0073387 A1 | 3/2013 | Heath | |
| 2013/0073970 A1 | 3/2013 | Piantino et al. | |
| 2013/0080922 A1 | 3/2013 | Elias et al. | |
| 2013/0110631 A1 | 5/2013 | Mitchell | |
| 2013/0139070 A1 | 5/2013 | Baldwin et al. | |
| 2013/0196690 A1 | 8/2013 | Crowley et al. | |
| 2013/0201185 A1* | 8/2013 | Kochi | A63F 13/52 345/419 |
| 2013/0232011 A1 | 9/2013 | Gupta et al. | |
| 2013/0242262 A1 | 9/2013 | Lewis | |
| 2013/0321390 A1 | 12/2013 | Latta et al. | |
| 2014/0002442 A1 | 1/2014 | Lamb et al. | |
| 2014/0046591 A1 | 2/2014 | Boldyrev et al. | |
| 2014/0101601 A1 | 4/2014 | Tang | |
| 2014/0181193 A1 | 6/2014 | Narasimhan | |
| 2014/0236882 A1 | 8/2014 | Rishe | |
| 2014/0250200 A1 | 9/2014 | Geurts et al. | |
| 2014/0274564 A1 | 9/2014 | Greenbaum | |
| 2014/0280278 A1 | 9/2014 | Harris et al. | |
| 2014/0359537 A1 | 9/2014 | Jackobson et al. | |
| 2014/0316192 A1 | 10/2014 | Massimiliano et al. | |
| 2014/0316691 A1 | 10/2014 | Ren et al. | |
| 2015/0032766 A1 | 1/2015 | Greenbaum | |
| 2015/0039443 A1 | 2/2015 | Soon-Shiong | |
| 2015/0058255 A1 | 2/2015 | Cork | |
| 2015/0061825 A1 | 3/2015 | Suzuki et al. | |
| 2015/0169142 A1 | 6/2015 | Longo et al. | |
| 2015/0220802 A1 | 8/2015 | Mazur et al. | |
| 2015/0245168 A1 | 8/2015 | Martin | |
| 2015/0262208 A1 | 9/2015 | Bjontegard | |
| 2015/0302651 A1 | 10/2015 | Shpigelman | |
| 2015/0310497 A1 | 10/2015 | Valin et al. | |
| 2015/0325226 A1 | 11/2015 | Rosedale et al. | |
| 2015/0378587 A1 | 12/2015 | Falaki et al. | |
| 2016/0019661 A1 | 1/2016 | Bouganim et al. | |
| 2016/0027329 A1 | 1/2016 | Jerauld | |
| 2016/0029368 A1 | 1/2016 | Borenstein et al. | |
| 2016/0055250 A1 | 2/2016 | Rush | |
| 2016/0080438 A1 | 3/2016 | Liang | |
| 2016/0142894 A1 | 5/2016 | Papakonstantinou et al. | |
| 2016/0169696 A1 | 6/2016 | Butts et al. | |
| 2016/0203223 A1 | 7/2016 | Hladik | |
| 2016/0232131 A1 | 8/2016 | Liu et al. | |
| 2017/0109807 A1 | 4/2017 | Krishnan | |
| 2017/0127128 A1 | 5/2017 | Seger | |
| 2017/0134508 A1 | 5/2017 | Kalis et al. | |
| 2017/0139207 A1 | 5/2017 | Jenabzadeh | |
| 2017/0193075 A1 | 7/2017 | Hegelich et al. | |
| 2017/0200296 A1 | 7/2017 | Jones et al. | |
| 2017/0220966 A1 | 8/2017 | Wang | |
| 2017/0270821 A1 | 9/2017 | Jerauld | |
| 2017/0295127 A1 | 10/2017 | He | |
| 2018/0004762 A1 | 1/2018 | Jazayeri | |
| 2018/0006993 A1 | 1/2018 | Jazayeri | |
| 2018/0060778 A1 | 3/2018 | Guo et al. | |
| 2018/0121029 A1 | 5/2018 | Mrad et al. | |
| 2018/0293308 A1 | 10/2018 | Miller et al. | |
| 2020/0242182 A1 | 7/2020 | Gokyigit | |

OTHER PUBLICATIONS

Dias, A., 2009. Technology Enhanced Learning and Augmented Reality: An Application on Multimedia Interactive Books, International Business & Economics Review, vol. 1, n.1.

International Search Report and Written Opinion received in PCT/US18/42169, dated Sep. 24, 2018 (10 pages).

International Search Report and Written Opinion received in PCT/US18/42355, dated Oct. 1, 2018 (10 pages).

Shirazi, A., 2014. Context-Aware Mobile Augmented Reality Visualization in Construction Engineering Education, Electronic Theses and Dissertations, University of Central Florida. Paper 4510.

Specht, M. et al., 2011. Mobile Augmented Reality for Learning: A Case Study. Journal Of The Research Center For Educational Technology, 7(1). Retrieved Jan. 18, 2012, from http://www.rcetj.org/index.php/rcetj/article/view/151.

R. Wang et al., "Taxi Rec: Recommending Road Clusters to Taxi Drivers Using Ranking-Based Extreme Learning Machines," in IEEE Transactions on Knowledge and Data Engineering, vol. 30, No. 3, pp. 585-598, Mar. 1, 2018, doi:10.1109/TKDE 2017. 2772907. (Year: 2018).

D. Widdows, J. Lucas, M. Tang and W. Wu, "GrabShare: The construction of a realtime ridesharing service," 2017 2nd IEEE International Conference on Intelligent Transportation Engineering (ICITE), 2017, pp. 138-143, doi: 10.1109 ICITE.2017.8056896. (Year: 2017).

J. A. B. Perera, D. Zhang and M. Lu, "Smart Maps through Semantic Web, Social Media, and Sentiment Analysis," 2015 IEEE International Conference on Information Reuse and Integration, San Francisco, CA, 2015, pp. 49-56, doi 10.1109/IRI.2015.18. (Year: 2015).

I. Cho, R. Wesslen, S. Volkova, W. Ribarsky and W. Dou, "CrystalBall: A Visual Analytic System for Future Event Discovery and Analysis from Social Media Data," 2017 IEEE Conference on Visual Analytics Science and Technology (VAST), 2017, pp. 25-35, doi: 10.1109NAST. 2017.8585658 (Year: 2017).

Y. Tian, W. Wei, Q. Li, F. Xu and S. Zhong, "MobiCrowd: Mobile Crowdsourcing on Location-based Social Networks," IEEE INFOCOM 2018—IEEE Conference on Computer Communications, Honolulu, HI, USA, 2018, pp. 2726-2734, doi: 10.1109/ INFOCOM.2018. 8486433. (Year: 2018).

\* cited by examiner

VIRTUAL WORK OF EXPRESSION WITHIN A VIRTUAL ENVIRONMENT

CROSS-REFERENCE TO RELATED APPLICATIONS

This application is a continuation of U.S. patent application Ser. No. 16/252,706, filed Jan. 20, 2019, and titled, "A VIRTUAL WORK OF EXPRESSION WITHIN A VIRTUAL ENVIRONMENT," currently pending, which claims priority to U.S. patent application Ser. No. 15/587,128, filed May 4, 2017, and titled, "A VIRTUAL WORK OF EXPRESSION WITHIN A VIRTUAL ENVIRONMENT", which claims priority to U.S. application Ser. No. 15/007,162, filed on Jan. 26, 2016, and titled "VIRTUAL WORK OF EXPRESSION WITHIN A VIRTUAL ENVIRONMENT," which is abandoned, and claims priority to U.S. Provisional Application No. 62/107,313, filed Jan. 23, 2015 and titled, "INTERCONNECTED ANALYSIS OF A VIRTUAL WORK OF EXPRESSION," which is expired, and also U.S. Provisional Application No. 62/109,533, filed Jan. 29, 2015, and titled, "A VIRTUAL WORK OF EXPRESSION WITHIN A VIRTUAL ENVIRONMENT," which is expired, and the contents of which are incorporated by reference in their entireties.

BACKGROUND

The history of man is very much a history of imagination. The human imagination is what has allowed our success as a species. Each new place explored, every bold step taken and every invention discovered required first an equally bold step of creative vision.

The earliest evidence of human creativity pre-date that of recorded history itself. From simple paintings on a cave wall to the oral tradition of passing down tales of wonder and heroic deeds from one generation to the next. From that very moment when a human being wrote his name on a piece of parchment to that day Winter day in 1439 when the first piece of paper passed through a printing press.

The way we tell stories and the technologies we use to convey them have changed drastically over the millennia but the core emotional reasons behind telling those stories remains the same, which is to have experiences beyond the confines offered by of our mortal limitations. We create our characters and the worlds they inhabit as a way to live vicariously through these characters.

That desire to have experiences beyond the ones available in our own are literally hard coded as deeply as our DNA. What else is the act of dreaming but an unconscious way to simulate experiences beyond our own lives. Yet despite all the advances in storytelling and technology provided by the advent of motion picture, video games, and theater, it continues to be the book that is second only to our dreams in spurring our imaginations. Books allow us to deeply delve into other worlds and they are the most insightful way to experience and share our stories and the story of humanity.

When this thirst for knowledge and creative expression integral to being human is connected to revolutionary and disruptive changes happening in the field of computing, a picture begins to immerse. Advances are occurring in disparate technological fields which may at first blush seem completely separate having no obvious connection.

Some of technologies such as deep learning and machine learning have until now been solely the domain of well-funded research groups, multinational companies, and supercomputers.

Machine learning and deep learning technologies such as those spearheaded by Google Inc. and IBM through their Watson® computer recently played successive games of Jeopardy and won against some of those most talented human players in the world.

This was once thought unthinkable although it was once equally unthinkable that a computer would win a game of checkers against a human opponent. Less than 10 years later Gary Kasparov, the world's champion lost a game of chess against IBM's Deep Blue®.

Machine learning technologies have a goal of receiving disparate sources of information and aggregating those sources, analyzing them to gain broad insights that can be used in a multitude of ways. They have the ability to learn and improve on their ability without the direct aid of a human operator and so can make better conclusions about the input they are given.

Other blooming and quickly advancing technologies such as "Virtual Reality" were once expected to spearhead the computing revolution only to be seen as a technological flop of the late 20th century. Since that time however many of the core technologies required for realistic immersive experiences have continued to advance unabated. Computing power has seen dramatic increases year after year. Display technologies have advanced in both their definition and the ability for screens to be miniaturized.

Input devices such as head tracking technologies have gained a degree of accuracy and a lack of latency and the price of all these technologies are finally reaching a price point which is accessible for average consumers.

Other supposedly unrelated base technologies are advancing at a rapid pace. Wearable tracking devices, originally created to track a user's daily fitness habits are already developing to become health tracking devices which monitor an array of bodily signs from a user's heart rhythms to skin resistance providing medical doctors a complete insight into a person's current health state.

EEG headbands that track brainwave states, movement tracking technologies such as accelerometers, gyroscopes, barometers and GPS receivers, multi touch sensors and any number of other sensing technologies have grown tiny enough to fit in a cell phone, all in the course of just a few years.

Light tracking and camera motion tracking systems are just starting to scratch the surface of their applicability to video gaming. Already available to consumers in forms such as the PlayStation Camera and Kinect camera use both the visible and invisible spectrum of light to track out movements and physical actions and even our facial expressions.

Some of these technologies are already seeing broad adoption in the daily lives of consumers, others have yet to see mass adoption but will in the short term start to make head ways into our everyday lives.

BRIEF DESCRIPTION OF THE DRAWINGS

The features and advantages of the present disclosure will be more fully understood with reference to the following detailed description when taken in conjunction with the accompanying figures, wherein.

DETAILED DESCRIPTION

Herein is a method and system describing a platform which is broadly applicable to a great number of industries among them, but not limited to books, journalism, education & art.

The platform described provides methods of rendering and displaying a virtual three-dimensional environment. Within that environment, a virtual object is displayed wherein the object or work has a purpose of, or at least enables, the sharing, recording or receiving of creative expressions or communication.

These inputs are then analyzed in combination or relation to gathered data and information about the virtual work.

The embodiments of the platform are as follows:

Rendering a three-dimensional virtual environment that a system user or his avatar may move around in and interact with.

Figure 1:
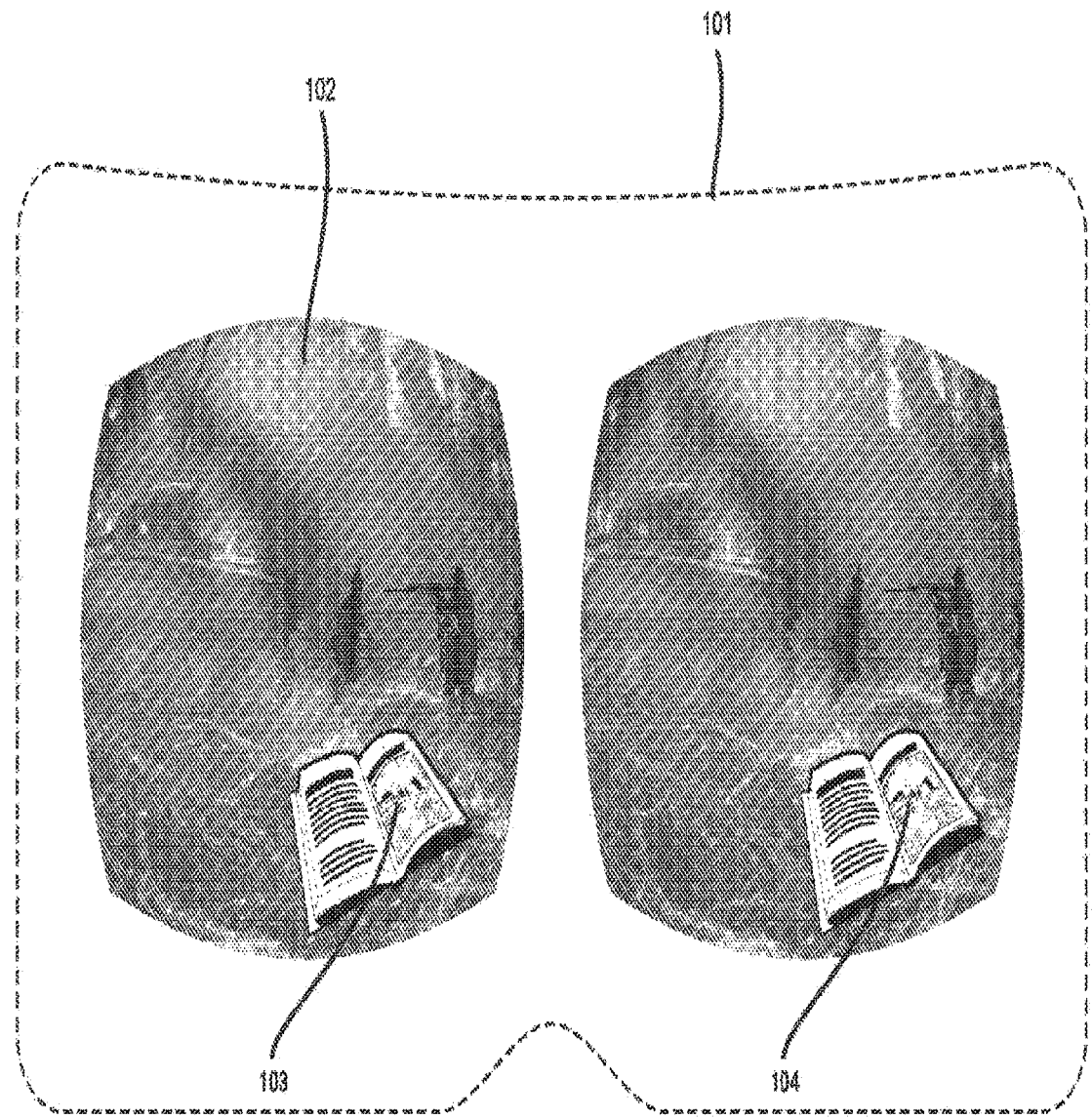
FIG. 1 shows a head-mounted display showing a rendered virtual environment, according to embodiments of the invention.

FIG. 1 shows a head mounted display FIG. 1. 101 displaying a rendered virtual environment FIG. 1. 102. A book as rendered inside of that 3D environment F1. 103. Both the book and the environment being on that is displayed in three dimensions w F1. 104.

The term "virtual environment" should be understood to consist of "virtual reality"

"augmented reality"

We will refer to the virtual object variously as a "virtual object, "work", "virtual work", "book", "virtual book" among other definitions, work of expression, work of literature, stories or story content.

Figure 3:
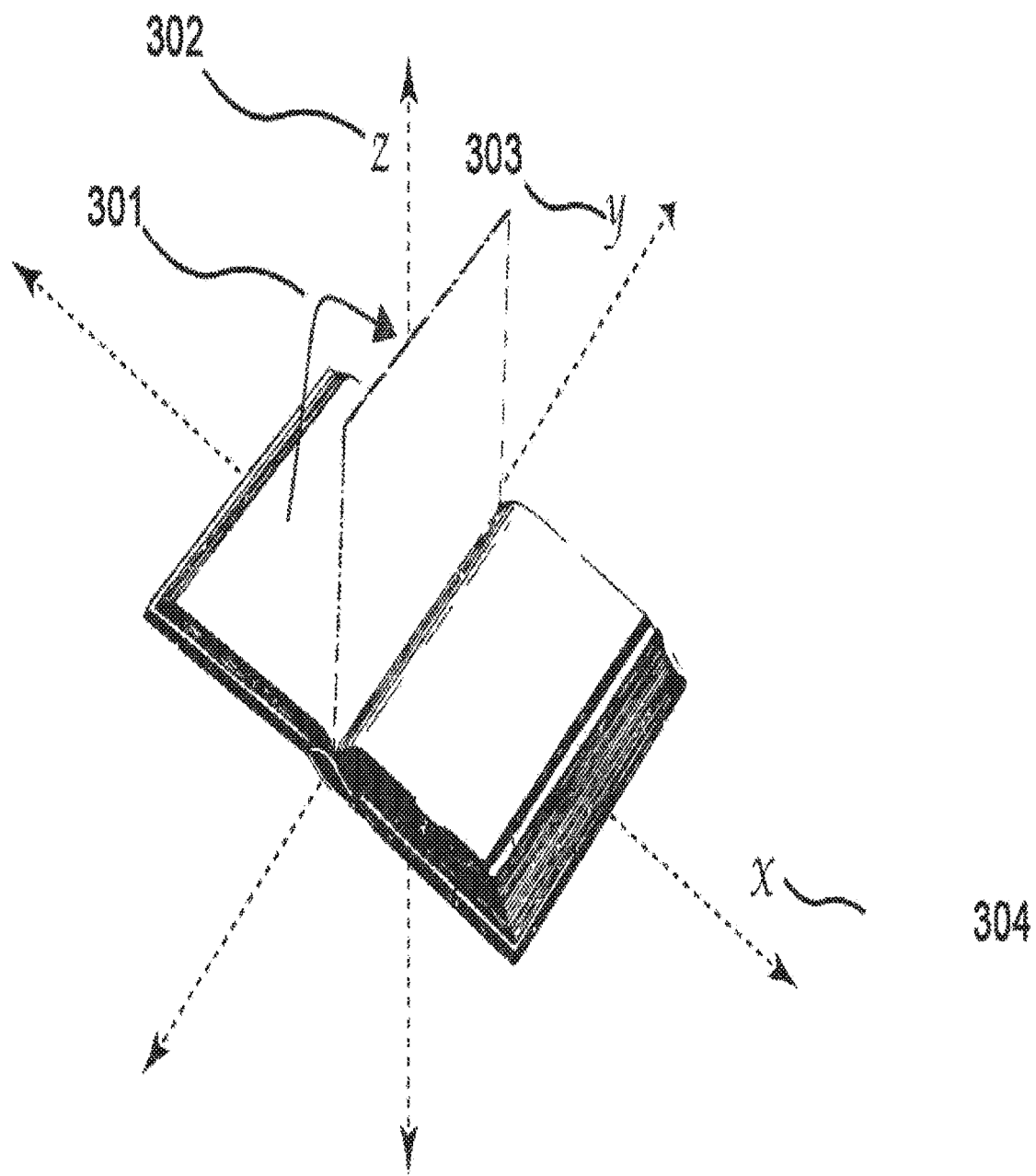
FIG. 3 shows a book as a page is turned, and the book is moved in multiple dimensions within a virtual space, according to embodiments of the invention.

FIG. 3 shows a book as a page is turned 301, and the book is moved in multiple dimensions within a virtual space 302, 303, 304.

While many different terms may be used to refer to the virtual object within this document but they are referring to the same thing.

That is, any object which may enable creative expression or communication.

It may be a book but anything fulfilling the role of expressing creativity or communication may easily fulfill the role of a book. That is, any object which can enable the sharing, recording, transmitting or receiving of content such as creative expressions or communications.

Examples of virtual works consist of newspapers, periodicals, comic books, painted canvas or even a single piece of paper.

The content within the book variously referred to as transmissions, communications, content, expressions or expressive content or story data.

Creative expressions and communications enabled by the object consist of but are not limited to written, oral, visual, audible, drawn, illustrated, typed, animated, or any other method of creative expression and or communication known to human beings.

The virtual work may take many forms. These range from a reproduction of an analog object, such as a paper book to modern technological replacements and equivalents, such as an electronic book.

It may also be a virtual reproduction of an object that would not normally fulfill the role of a work of expression such as a wall. One that is only rarely acknowledged to play this role, such as beach sand, a foggy window or a dirty car.

The work could be a completely novel object of various shapes and dimensions rather than a reproduction as long as it fulfills the stated role. Furthermore, the expression or communication may exist within the environment, as the environment or outside of the confines of a specific object within the environment.

In some embodiments the object has the same features, qualities, and capabilities as its real-world counterpart. In other embodiments, the objects are able to act in ways not consistent with, or have capabilities or qualities out of the ordinary for real world objects.

An example embodiment might be a reproduced paper book with display properties, UI properties, multimedia and sound reproduction capabilities not seen in real world paper books.

In either case, any object within the virtual world that is made to fulfill a work of expression will just as easily fulfill the role.

The work might allow a system user to create his own expressive content within the work or this functionality may be disabled, depending on the work. In addition, the work may variously be filled with expressive content from an author or another creator upon receiving it within the system, it may be partially filled with content or completely blank.

An important note is that the system is not at all limited a virtual book, and functions just as well in embodiments where a real book is used in place of a virtual object.

In the example of a virtual book, the book is reproduced to allow numerous interactions, while in an embodiment using a real world object, any interactions available to such an object, analog or electronic would be tracked by numerous methods.

The following embodiment will provide more detail of one such working embodiment.

The system provides a method for tracking, recognize, and analyze system user actions though various input and tracking methods through a multitude of input devices.

In this embodiment the tracking of these interactions will consist of monitoring the movements of the book within a 3D space, tracking a system user's reading position otherwise referred to as positional data, vis-à-vis the virtual object's content.

Some of these devices are consumer ready such as the Microsoft Kinect® and others are on the short- and long-term horizons of the changing technology landscape.

In such a preferred embodiment a system user would interface with a virtual environment through the use of a head mounted display, an IR tracking camera, wearable haptic clothing, and a capacitive touch walking platform. When used in combination, these systems would allow a system user to move around with the environment and objects within it in ways similar to the real world. A system user would then be able to recognize or select a book within the environment and begin interacting with it. It should be known that while this embodiment is preferred, any embodiments described throughout this disclosure are also equally good options.

The look, feel, and available interactions of this virtual reproduction are very close to that of a physical paper book made of matter that you might find in a Barnes and Noble or in a library.

All of the interactions available to a human being, all the ways the atomic matter of a real book could be interacted with in the real world are potentially available to the book within this environment.

With the right output hardware, a system user could even smell the fresh ink and crisp paper of the book. Unlike with the objects in the real world however, the interactions and abilities here can go beyond the everyday possibilities, these works may be augmented with capabilities beyond what is usual or possible for the object's real-world physical counterpart.

A book is a stand in for simplicity of description but a book could just as easily be replaced with any object or device that has a purpose of enabling creative expression and/or communication.

A system user will be able to enter this environment either directly as might be possible using augmented reality displays or through the use of an avatar as might be usual for a head mounted display.

FIG. 1 shows a virtual book being moved and its pages being turned just as a book would in the real world. A system user could turn the pages of the virtual book 101. Pick up the book and move it around within the dimensions of the virtual environment 102, 103, 104. They may scan the pages with their eye 105, read the book's words, view its illustrations and use the book in a similar way as they would a book in the physical world.

In this embodiment the virtual book's movement and location within the virtual environment may be tracked with the addition of reading related positional data and a system user's interactions through the book's content.

In either case the goal in this embodiment is to monitor the system user as he reads and interacts with the virtual book. The system will track a system user's interactions to determine the reading position within the virtual paper book.

The system will use any data available to it to gain detailed insights into the location a system user is currently perceiving. Locations are tracked relative to broad swaths of content such as chapters or specifically such as a single word or group of words.

Additionally, a predictive analysis based on reading speed could be used to determine the reading position and content that a system user will be reading at a given chronological time in the future.

Input data such as this is gathered and processed by a CPU for analysis.

Explanation of Inputs and Outputs.

Inputs

Inputs are gathered from one or more system user(s), avatar(s), virtual environment(s), virtual object(s) and expression(s). Any information, interactions or combination thereof is said to be the input.

The system tracks such information, actions and interactions about virtual elements and or real world elements objects and runs these inputs through a process composed of monitoring inputs, analyzing those inputs and producing output based on those analysis.

These inputs include any qualities, quantities, interactions or any other information about the virtual work.

The resulting output of this combined analysis is used to create or transform the nature of and content of the virtual environment, one or more system users' avatars, one or more environments, or the virtual object itself.

Input data also consist of any information gathered about the current state, actions and interactions of system user(s) & avatar(s) both individually and socially in relation to the work and its content.

These data inputs may be gathered in the real world through input devices tracking a person using the system, that system user's current state and actions, and in the virtual environment by detailed tracking of elements of the environment including its avatars and the virtual environment.

Outputs

Output data consist of any changes caused to any aspect of the virtual environment based on the analyzed input.

It encompasses any displayed output in the real world, in the case of mixed reality, It encompassed physical changes into the real world through feedback devices available.

Examples of output data might consist of changes to the avatars, characters, settings, locations, displayed educational or medical data or any other changes caused to the virtual environment.

Normandy

The following example embodiment and any below may occur with a combination of fully virtual environments or mixed reality environments. These are not mutually exclusive and while one system may have capabilities that the other does not, they can each provide an equal experience in their own way, and can be run in both embodiments.

The following is a hypothetical but entirely possible preferred working embodiment as might be put into practice.

The following description is a hypothetical and uses a hypothetical "system user". Like a drawing, this and other "example" embodiments are simply a more approachable way to explain the features of the system in an easy to understand and approachable manner, but should not be taken to limit the system in any way.

It does however clearly explain the possibilities of the system in action. It is just one specific such example of how the system consisting of a near infinite multitude of such examples that might be chosen.

In this example, a system user has a head mounted display on his head. He might be sitting in a 3D rendered room, at a 3D rendered desk.

He selects a tome close to his heart, by a well-known author about the second world war. The moment he selects the work from the UI, the environment around his desk changes to the beaches of Normandy, France, Jun. 6, 1944.

At the same time, the book is rendered on the virtual desk in front of him.

As the system user picks up the book, the clothes of his avatar change at that very instant to that of a US soldier, upon inspection of the dog tag around his neck, he sees that his character's name is Private First Class Joey Larson.

As the system user flips the book open and turns to the first word of the first chapter, he looks to the distant waters, he sees the U boats approaching as explained in the content he is currently reading. The allied invasion force quickly approaching the beach.

His action of selecting the book and interacting with it has caused the system to analyze the contents of the book, track the system user's reading position within it by analyzing the viewing direction of the system user's eyes. The system then cultivated a number of online sources including Wikipedia.com, Google.com, sites about World War II information about World War II documentaries and then do an aggregated analysis of the information determined the contents of the scene information and generated scene data that the system determined likely aligned with the analyzed data.

It then chronologically progressed the scene in synchronization with the system user's current reading position.

As the system user continues to read the U-boats reach the shore. The system user is given a choice in the form of a system user interface projected from the book floating within the space of the environment. To experience and interact with the battle or to continue reading and to see the battle from the perspective of the spectator.
Apartment The following description should not be taken to limit the system in any way. It is just one specific such example of how the system consisting of a multitude of such examples that might be chosen.

In this example, a system user has a head mounted display on his head. He might be sitting in a 3D rendered room, at a 3D rendered desk.

He selects a tome close to his heart, by a well-known author about the second world war. The moment he selects the work from the UI, the environment around his desk changes to the beaches of Normandy, France, Jun. 6, 1944.

At the same time, the book is rendered on the virtual desk in front of him.

As the system user picks up the book, the clothes of his avatar change at that very instant to that of a US soldier, upon inspection of the dog tag around his neck, he sees that his character's name is Private First Class Joey Davis.

As the system user flips the book open and turns to the first word of the first chapter, he looks to the distant waters, he sees the U boats approaching as explained in the content he is currently reading. The allied invasion force quickly approaching the beach.

His action of selecting the book and interacting with it has caused the system to analyze the contents of the book, track the system user's reading position within it by analyzing the viewing direction of the system user's eyes. The system then cultivated a number of online sources including Wikipedia.com, Google.com, sites about World War II information about World War II documentaries and then do an aggregated analysis of the information determined the contents of the scene information. It then chronologically progressed the scene in synchronization with the system user's current reading position.

As the system user continues to read the U-boats reach the shore. The system user is given the opportunity through a floating system user interface projected outside of the book. to experience and interact with the battle or to continue reading and to see the battle from the perspective of the spectator.

As the system user looks up from the book he is reading, he begins to hear, the sounds of fire and pain, the casualties on the battlefield. He feels the emotion of that say in a way not possible since hearing the stories his grandfather told him of what it was like to live though the experience.

He hesitates but looks up only to actually see and hear the battle nearby in all its unfortunate glory. Then as the system user reads on, sadness tearing up in his eyes, he turns to next chapter, suddenly he begins hearing the sound of percolating coffee, The book suddenly cut scenes to a different setting. He looks up to see a city apartment, as he continues to read the book explains that he is now in a New York apartment belonging to Corey Davis, the brother of Pfc. Joey Davis. The system user's avatar now wears the clothes of Corey Davis and is the character of Corey Davis. Corey hankered to join the war effort but due to a back injury was decline service by the Army.

The system user notices a character walk in the door of the apartment. The book explains the character to be the father of the two brothers as he walks in, he says "Hey Cor, you want a coffee?" He hears a voice come from his own direction, as if it was his own "sure Dad, how are you doing".

Figure 4:
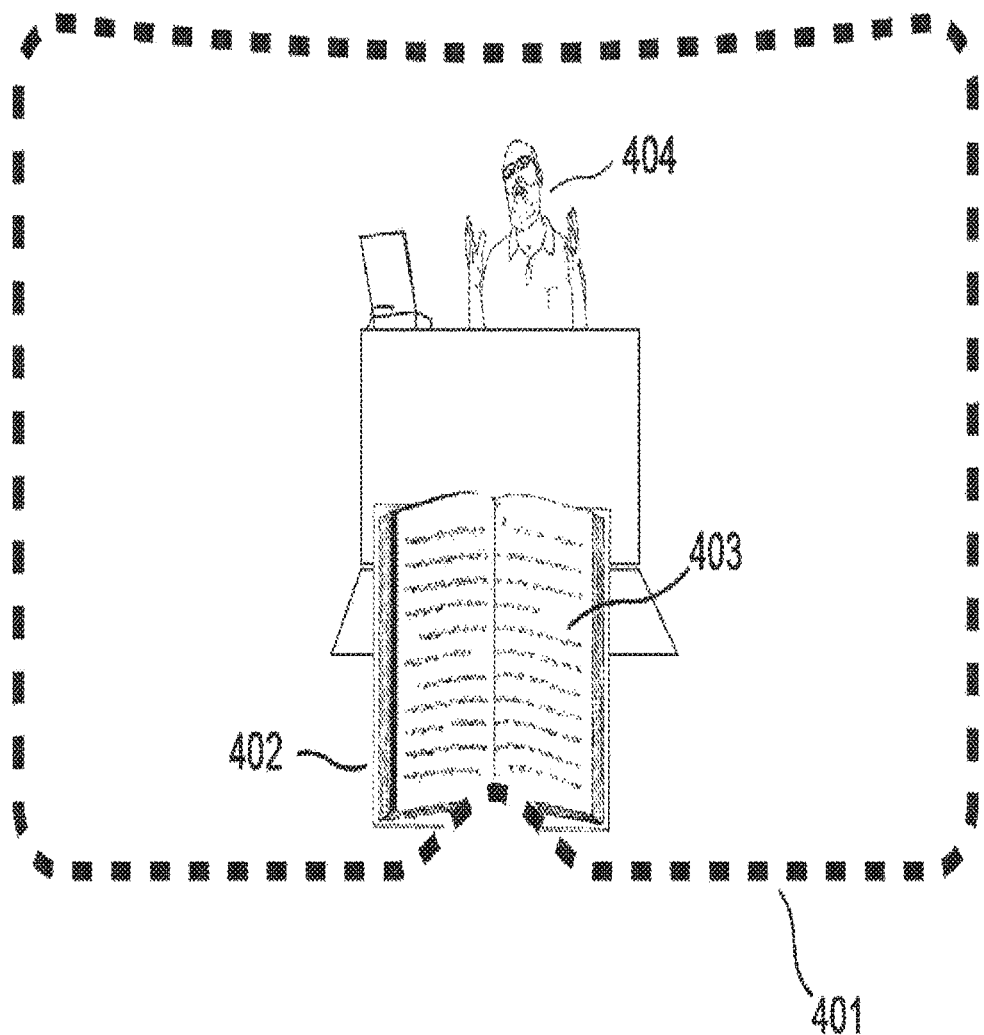
FIG. 4 shows a head mounted display that enables a user to receive a virtual environment including a book inside of the virtual world, according to embodiments of the invention.

As the system user reads his character and the other characters present in the scene, in this case Corey and his father, speaks and acts the scene in the book word for word. This can be seen in FIG. 4 401 shows a head mounted display allowing the system user to receive the virtual environment. FIG. 4 402 shows a book inside of the virtual world being read by a system user. FIG. 4 403 shows the words being read by the system user chronologically. FIG. 4 404 shows the character speaking and acting in chronological sync with the system user reading the book. As a system user reads, a character on scene is acting out and speaking the scenes in real time.

Davis's words are spoken in line with the reading position.

Events described in the book, such as Mr. Davis going to get a pot of coffee in bringing a cup to Corey, is also presented in real time in chronological order as they are being read.

In this way a system user's reading of a book is, played out like a movie word for word. The system user almost literally is living in the world of the book.

It is possible to have the scenes acted out in any unsynchronized form as well or any combination. Some embodiments would have a system user would read an entire chapter and then see the content or scene data of that entire chapter played out at once.

The system is not solely limited to completed works, it also allows the creation of works.

In such embodiments the system might use an input device to recognize the input of creative expressions in the real world. Other systems may track inputs a system user makes relative to the virtual world.

For example, let's take a novelist who is writing a book. In this embodiment and physical input device is used, in this case, taking the form of close approximation of an antique typewriter.

The novelist is writing a book about piracy on the high seas in the early 1800s.

As the system is able through its input and analysis of the writing style and the essence of the information being written, it begins to change the displayed environment around the system user.

In this case, the system has recognized that the story takes place when the 1850s to ship called the Ristoon.

The system through inputs from the system user, and gathering and processing thousands of pages of information from outside sources about. Such information might consist of, how such ships were built, of what materials, how they might have appeared from outside and their interiors, the sounds they made whilst sailing, how the crews dress or talked.

The may track the novelist as he types his book and once the system through its analysis of the type information and has come to a conceptual understanding of that content. This conceptual data or profile data and the resulting scenery data does not come from one specific piece of gathered information.

Rather the system uses numerous clues based on observed connections within the work.

The system does not gather information about the ship in isolation but through an intelligent analysis connects different parts of the written word. It might look at the era or year described in the work.

It might notice that the work takes place on earth in the 1800s, that the work is one of nonfiction;

The system through gathering information from any number of outside sources.

In a way similar to IBM's Watson and other dynamic learning computers are able to come up with answers based on a culled database search resulting in more accuracy than their human counterparts.

This system will function on any intelligent computing system, and might even be able run on "Watson" itself but specifically uses a system with one or more processors.

With similar or superior capabilities is also able to come to a conceptual understanding of data and answers to that data in a way humans do not have the capacity to achieve.

It does not speak of some alternative reality. That is a biography, that the biography is about a specific captain of that era.

It might determine thousands of connections like this in addition to adjectives describe.

The system also has applicability for museums. In such an embodiment a holographic laser display system, or other system providing a mixed reality experience.

Let's take an example of a museum. As spectators walk through the museum they will come across various exhibits.

This may be anything from dinosaurs to cars from computing or any other information that that might be found in a museum such as the Smithsonian for example.

As these visitors read the placards, or monitors displaying information about each exhibit, the system though some physical input device may display a three-dimensional representation either in front of or completely encompassing the visitor.

This information could be visual information related to the exhibit. Whether it be educational or just to provide additional entertainment.

An example might be visitors of the natural history Museum at the Smithsonian®.

In a related hypothetical working embodiment, one or more uses gather at an exhibit about the Jurassic period. The system displays a visual environment that completely fills these visitors' field of view in 360°. This might display the prehistoric environment.

In this embodiment a display showing an animated progression related to the exhibit might be synchronized with the three-dimensional environment.

This may show not just one environment, but the environment could change from one era to another in progression. This also shows how the system is not restricted to a single environment, environments could change completely or could move to different environments based on the analysis and synchronization process.

A Use Case for the Medical Industry.

In a medical emergency room, might walk up to a patient chart outside of the emergency room. As the doctor looks at the chart, a 3D representation of a recent CT scan appears in midair, this allows the doctor to make a superior determination about the reason for the patient's hospitalization Another example may be a surgeon operating on a patient. Before the operation begins as the operation is occurring, the doctor may pick up or view a paper binder with operating instructions that has been prepared ahead of time. These types of instructions are generally use by surgeons to map out the exact needs of the patient during the operation. As the attending physician views the surgical instructions, a 3D representation of the human anatomy might be shown in relation to the surgical instructions. The floating 3D representation shows the exact structures within the human body or specific visual information to help guide the doctor though his surgery.

The system has broad applicability in educational settings.

For example, a situation where a classroom is learning about the solar system.

In this embodiment a mixed reality display may be used.

This could be anything from traditional augmented reality glasses, to a holographic or laser display. In any case the students would interact with a book within their class or other educational setting.

A teacher might guide the students through their textbook which describes the orbits of the various planets.

As the teacher points to a blackboard, which in this circumstance acts as the object or work, the system displays three-dimensional graphic representation of the sun, and visual representation of the planets and the orbiting tracks that the planets follow, may appear in midair.

As the teacher begins to speak in depth about the planet Mars, the graphical representation a three-dimensional of the planet. As the teacher might speak thin atmosphere of the planet, she could then point to information on the blackboard about habitability of the surface itself.

As he touches a pointing wand at the blackboard location which speaks about the surface, a light detecting device detects the movement of the warrant to the work.

This changes the three-dimensional representation in size and scope. The rounded object, which was just seconds before only about two feet in diameter, begins to zoom into the surface, the object growing to encompass the entire room.

The 3D depiction of the planet is no longer an isolated object floating within the room but now encompasses the entire room. From the viewing position of those within the classroom, they appear to be on the surface of Mars. Rather than a floating object, the depiction shows them as inhabiting the surface itself, and they could see the ground the mountains and the desolate red landscapes of the red planet.

This is just one such example, and should not be seen to limit the system to this example, however it does show when a working system might look like within an educational setting.

Another Working embodiment, may be a history professor talking about the rise and fall of ancient Rome. The class goes through their text books which go over a short synopsis of each era of roman history.

A 3D representation of Emperor Caesar guides the class page by page text page by page though the text book. This computer controlled avatar goes point to point, page by page, from the Rome's early founding by the mythical Remus and Romulus, to the adoption of Christianity and the creation of the Byzantine Empire. Throughout this process scenery data, such as characters, settings and other visual information changes. This in effect takes the students through a guided audiovisual journey of ancient Rome, providing and enhance learning experience of learning history by "being there".

And environment related to the field of journalism might function in this manner.

A newsreader receives his daily copy of the New York Times. This may be a physical version of the New York Times that the system tracks as input or a virtual object.

In either case, the man as in all examples herein, may use mixed reality, virtual reality or a combination thereof.

As the news reader progresses through the international stories of the day, the system could transport the reader through its output scenery data, showing the locations and events of the daily story.

Unlike television news where a system user would only see that new story as might be explained by the television anchor.

This would allow a reader to experience the events and locations of those news stories in three dimensions as if the system user was there.

This has great application for enhancing and experiencing the world around us, while still allowing us to experience the news through the traditional medium of a newspaper or magazine.

The Artist

Let's take an artist whose creative expression is painting. This could be any style of art, and the campus could be real or virtual.

In either case the system would be able to analyze the painted work, of the landscaping painting.

As the painting goes from a blank canvas to something resembling a "work of art" the system might track the artistic input or expression created by person, in this case visual.

As the painting is in the process of coming together the system synchronizes the painting on the canvas and through its intelligent analysis of the visual properties of the painted work, displays a three-dimensional version of the painting around the artist.

In this way the artist is placed with in a realized of three-dimensional representation of his own art.

Tracked Input

What is input data? It is a myriad of information and data points are collected about one or more people using the system, any information or elements within the virtual environment.

It is outside information from various sources about various topics whether specifically related to a system user, the virtual object, it's content or expressions or anything other information feed into the system for analysis.

Some number of data point about a system user's virtual avatar or representation within the virtual environment are also collected and analyzed by a CPU.

The data points are gathered by various input, tracking and detection systems. Data points could be any information about one or more peoples current or past actions, interactions or state of being.

These include but are not limited to tracking of current, past or predicted information related to a person's state within the real or virtual worlds.

The following are more detailed examples about the type of data that may be considered "input data". It is important to understand that these are simply a cross section of possible embodiments and should not be taken to limit the scope of this disclosure to just these examples.

Interactions with the Work

Any information about a system user's avatar that may be tracked can be including;

Achievements or the current level or status of the avatar.

Actions or interactions of an avatar or system user within the virtual environment, such as generated scenery information, objects, or computer controlled avatars.

Actions, interactions, or communications between one or more other avatars within the environment or between multiple separate or connected environments within the system.

Any tracked information but without being limited to the above may be gathered, processed and analyzed. Crucially however the above information is not gathered in isolation.

It is gathered in relation to any possible combination of interactions between work(s), system user(s), avatar(s) or environment(s).

Any information about a system user's avatar that may be tracked can be including;

Achievements or the current level or status of the avatar.

Actions or interactions of an avatar or system user within the virtual environment, such as generated scenery information, objects, or computer controlled avatars.

Actions, interactions, or communications between one or more other avatars within the environment or between multiple separate or connected environments within the system.

The combination might consist of the tracked system user information above and that may be tracked in relation to the work itself or the scene information generated from it. This may consist of;

Interactions with the Work—Virtual World Inputs

Alternatively, it could be tracked signals of a system user or his avatar within the virtual environment, such as;

A system user or his avatar's interactions with the work within the virtual world or interactions with other system users. This may include;

Moving the work either within the virtual environment or between virtual environments. Adding or removing, receiving or transmitting any content to or from the work.

Giving or receiving the work to or from another person or avatar.

Operating or controlling the work in some manner. Using or not using or retrieving information to or from the work for any given amount of time.

Combining the work with other works or splitting the works into different parts.

A system user or his avatar's location or movements within the virtual environment.

A system user or his avatar's location or movements within the virtual environment.

A system user or avatars interactions with one another.

A system user or his avatar's location or movements within the virtual environment.

A system user or his avatar's location or movements within the virtual environment.

A system user or his avatar's location or movements within the virtual environment.

A system user or his avatar's interactions with scene information derived from the virtual world.

This section talks about what is going on around and to the book. It takes the book's perspective to speak about what I felt was ambiguous about my first description when I said the words "AND IN RELATION TO THE BOOK."

This was a bit of a revelation in explaining it correctly.

Input data is not limited to system user data, or information about that user's interactions a work either directly or through and avatar.

Has the work been moved to a specific location within the environment?

How many people are interacting with the work?

Are these avatars close to the work or far away?

Is the work currently in a default setting, an unrelated setting, or in a setting of its own content?

Other embodiments may track input data relative to the expressive content and provide scenery data out of synchronization, or synchronized but not as a user is progressing with any specific piece of content.

An example might be content shown about a chapter at the end of a chapter, or at the end of a book itself. Or even information related to the expressive content of more than one works.

It might be information about a series a multitude of journals, notes, movies, comic books, newspaper articles, printed pages or any number of expressive works.

The system is not limited to analyzing the input data of one piece of expressive content and it may use more than one expressive work either in combination or separately, in parallel, or in sequence, either synced or chronologically separated.

This input data is processed through a number of algorithms, analysis techniques and computing methods.

In many embodiments the aim of this process said to be discovering the essence of the expressive content or information. Although this may be achieved through different computing methods for depending on the environment, it uses among other techniques, semiotic analysis.

In some embodiments the system might go through a process of gathering raw input information and process it with an aim of forming connections between disparate and varied sources of information. From this the system gathers concepts and comes to an understanding of the data and how the various inputs and their content related with each other.

A preferred embodiment processes raw input data from internal and external sources. This raw input data is processed to find visible or hidden connections between these disparate sets of data.

These connections are then reduced to hypothetical concepts which provide a subtle and detailed view of the information. These conclusions shall be known herein as conceptual profiles.

Several computing methods are available to the system. While any and all traditional computing methods are available to the system, the system may use and combination of traditional and nontraditional communing methods.

Nontraditional methods such as but not limited to deep learning, machine learning, and dynamic learning will be used in the goal of understanding the concepts and essence of expressive content. While traditional methods may assist in this, many nontraditional methods, algorithms and analysis techniques are available to obtain this goal of gathering an understanding of expressive content.

Gathered information may go beyond simply input data as described above. Many disparate sources of information may be accessed and passed to the analysis process along with the input data. This includes information contained on internal databases, external databases, whether private or publicly available. Online sources consist of online encyclopedias, research databases, patents, government databases, dictionaries, current and historical periodicals and/or newspapers. Just about any website or online source that a human being would be able to gather information from is included, with the addition to any source that might require a computer to access and/or understand. Local databases may include any information stored locally or on offline sources, including information stored on magnetic storage, non-volatile storage or other means of storage medium that is accepted as statutory subject matter.

These analyses include but are not limited to the following. Although these are stated specifically, different embodiments may use many different analysis and processing techniques not listed here.

Natural Language Processing

An analysis most of us have become familiar with through interacting with,—speaking—to our smartphones. Natural language processing is an analysis technique aimed at understanding human language. This could help the system understand written language within the content. While the systems abilities would not in any way be limited to processing written content, NLP analysis could be used to process any written content to understand words in a way similar to the way a human would read and comprehend it.

Pattern Discovery

A method of finding patterns within information, could be used to locate patterns within the written information or story to help come to a conclusion about its contents.

Predictive Modeling

Predictive modeling may be required in embodiments where a system user is himself Is providing the opportunity to create new content. Some embodiments speak about a blank or partially completed work where a system user can at his own creative expression within the work. In these embodiments, predictive modeling can be used, possibly in concert with the other analysis techniques to not only gain an understanding of the content of an expressive work but to predict information about the constitution and concepts of content that is likely to be created.

Hypothesis Generation & Evaluation

This gathered information then uses among other techniques, knowledge representation, and hypothesis generation.

These techniques are uniquely able to analyze many disparate sources consisting of data such as from online sources, internal databases, input data. The system then uses this disparate information to generate a hypothesis about the nature of the expressive content.

These and other computing methods and analysis techniques are used to determine big picture and little picture guesses about the essential nature of the expressive content, it's story and any specific elements or constructs therein.

It's important to note that not all embodiments go through this analysis process, and some skip it entirely relying on a process of pre-generated 1:1 synchronization between the work and the outputted scenery data.

In this description we term the output data as any changes, modifications, transformations or the creation of any new information within the environment based on these hypotheses.

In this way, the conceptual profiles may be deemed part of the analysis process, or part of the output process.

Even though they are a type of output as that word generally used, even so, it's not what "stage" they reside in that is important, it's that these conceptual profiles allow output to occur.

These profiles are more or less a way for the system to categorize its findings about what the story, the expressive work or the communication is about.

Concept profiles may be determinations or hypothesis related to any number of story elements, or in the case of nonfictional work, any number of informational attributes or concepts.

These include but crucially are in no way limited to the following examples;

Visual Character Profile: This is any information about a character's physical appearance, manner of dress, or any information related to it.

Audible Character Profile: This is any information about the sounds speech method of communication or any other audible related information about a character.

Communication Profile: This is any information that is communicated by or about a character within the story Character Profile: The actions the character takes, whether it be information about a character's movements location actions, speed of movement, thoughts, words spoken, or any other active or passive actions of a character.

Character interactions Profile: are any communications or interactions between characters.

Character Event Profile: Is any events that occur to the characters within the story.

Character Time Profile: Is any information about character actions or interactions within a specific chronological period of time.

Setting information such as:

Local Profile: locale information may be broad consisting of a universe, galaxy, planet, country, state, region, city, or town. It could also be more specific locations such as a neighborhood, street, building or a single, room or any other locale of any dimension.

Time of year Profile: Time of year relates to any time within 365 days a year, or dependent on the planet in question, a year may constitute something different. In the case of earth, it could be about a specific season holiday and anniversary of some important date, such as Pearl Harbor or any other yearly related data.

Time of day Profile: this could be anything about how the story unfolds minute to minute, hourly or within a given 24-hour period.

Elapsed time Profile: Time related data may be about time from one event to any other given event.

Mood Profile: This may be anything such as temperature, lighting, mood or any other environmental emotional data about the content.

Geography Profile: this is any natural data about the setting and where the story takes place. Any scenery data including information about whether the scene is flat or mountainous, loss with greenery and trees or an empty desert, a harsh climate, a warm paradise.

Man-made or synthetic objects: This will be any information about anything within the scene that is not natural and created by biological life. This would include obvious man-made objects such as buildings, cars, changes to natural environment such as pavement or any other indicators of synthetically created objects and locations.

Historical Profiles: Historical time is any information related to a known or fictional date time or place. "Include any information related to man-made objects known for specific period of time. This includes character related information, such as style of dress for the period, manner of speech, architecture for the period or any other story related information that is somehow connected with the historical period in time.

Plot Profiles: This is any information about a story's narrative and the events within the story. This naturally encompasses all other types of data we speak about above. Any information about characters, setting but also the chronological order that the events occur in, the dramatic structure, Literary elements and narrative structures both linear and nonlinear.

Direction and Predicted Modeling: Is any information gathered and predictions made about the direction of a story and how it might play out.

Informational Profiles: In the case of nonfictional, educational and other expressive or communicative works which do not rely on story driven elements, the system will gather an informational profile. Examples of informational profiles consist of the following;

Medical-Related Profile: Any data related to the field of medicine or fitness, whether it be a patient's personal medical data or history, some data related to medical research, elements and objects related to medicine, such as the structure of the human body, DNA, surgical information or any other information related to the field of medicine. This information may be called from disparate sources and provided to a surgeon or Dr. Within a mixed or virtual environment.

Educational Related Profile; Any information related to content directed within the field of education. This includes information that might be found in textbooks, whether they be related to science or scientific objects or information, literature language, mathematical, historical, data such as historical events, or any other information that may be taught within an educational setting whether it be first grade or university level.

Commerce Related Profiles: Include any information related to commerce, financial, self-help, leadership and any other information related to the field of business, Stock market, commodities, and the depiction of other commerce related information. The analysis may take disparate information about market trends and other disparate information about past current and future trends, trades and actors within the market as part of this profile.

Statistical Data; Is any information related to the field of statistics.

Journalistic data; is any information about world events, what is going on in the world, how disparate events relate to each other, predictions of future events, is written by a journalist within a newspaper or other journalistic medium.

The system is not limited to the above data profiles, and many other profiles may relate to any number of different industries or types of content and expression information whether visual, writing or oral, story, informational or communicative.

In addition, the generated profiles are merely an organizational construct, in short, it is the way for the system to categorize different types of input data, come to conclusions about such data and output information into recognizable categories.

This might be helpful in the system analysis but also provides a way for a human operator to more easily understand the hypothesis.

Even so, profiles as described do not isolate the ability of the system to analyze collected data or come to determinations based on that any input data it has available to it. They should not be seen as limiting either the type of data gathered or hypothesis concluded from that data. Some embodiments may work just as well without a system of organized profiles.

The system may aggregate data in different ways, and come to conclusions about information not just within a given profile but across profiles as well. Other working embodiments might use entirely different categorization methods, analysis methods, or computing methods.

In either situation, the system is able to gather different kinds of information from disparate sources, and using the aggregated data to come to a recognition or understanding of the essence of the expressive content or communication therein.

The profiles gathered are not simply a bunch of randomly aggregated information. While some of the information may be randomly gathered for one reason or another, the system uses one or more computing methods or analysis methods either to a hypothesis and understanding of the content of the virtual object.

This gathered information and any hypothesis generated may be performed by one or more systems.

These may be performed on a single CPU or multiple CPU's and the means for producing or processing the conceptual data is varied.

This may be in the form of an artificial neural network, cluster analysis, hierarchical clustering outlier detection, association learning or any other number of techniques, analysis and computing methods as a means for processing the input data.

The hypothesis and determinations can be both very broad or very specific depending on the input data.

This hypothesis consists of any understanding, comprehension, prediction, determination of the content, the connections between the content and how input data and gathered internal and external sources of information relate and interaction with one another.

The system then uses these hypotheses to determine which data to create, modify or remove from any and all elements of virtual environment(s), avatar(s) and virtual object(s) or physical object(s), to any feedback devices or outputting display devices.

Output is considered any information the system produces from the analysis process.

and are deemed herein variously as "scenery data", "scene data", "scene information", "feedback data", "display output" depending on the type or method of output.

Changes caused by the analysis of inputs.

System output is any information the system produces through analysis of user input data. This information may be pre-rendered, procedural or generative data produced through this analysis.

This analysis does not need be processed using machine learning or powerful computer systems.

Embodiments that don't use such techniques should not be considered inferior, they simply have different applicability in one embodiment may work better for one user and another with another user depending in requirements and/or the situation, industry or use case.

Some embodiments use pre-generated output data such as those created by an author to match his work.

This would allow a creator to have full "creative control" over how system users interact with the work and how "output data" is rendered in relation to which input data.

For example, in an embodiment where the system renders sand display's visual output data that an author or a publisher created to fit specific sections of the work.

An example embodiment might be visual or audible output data synchronized to chronological reading position.

This embodiment would be closer to that of an interactive book or a flip book in that the content is already generated by a human artist/creator. These creations may then be synchronized to specific user actions were linked via tags, OCR detection or other cues to the work of creative expression.

In yet another embodiment, the author or creator may be able to allow a creator to control generative or procedural output.

This might be superior for an author or publisher who wanted to enable system users to use their expressive content within the system, but did not want to put in the extra time or effort to create specific content.

In some embodiments a human would pre-program various conditions, this might be helpful in situations where the processing speed to do intelligent machine learning analysis are not available to a user.

Some embodiments would allow an author or publisher the ability to set any number analysis modifications, or output conditions, providing some human control over the outputted generated work. The output data, how and when the output data is output in relation to the input data.

In either case the way the system gets from input data to output data may take various paths, from human guided, intelligent analysis, based on pre-programmed conditions or matching inputs to pre-created content.

The system can handle any of these, a mix of them but is in no way limited in its method of producing output. These range from traditional or non-traditional computing techniques analysis and completely autonomous or with human guidance.

Any information output through the gathering or processing of input data, that may be perceived by the 5 senses is deemed "Scenery Data".

An example of this would be changes produced by the system based on the analyzed input data, whether that analysis includes hypothesis generation or not. Additions, modifications, transformations or deletion of any information within the multi-dimensional virtual environment or to any directly or indirectly connected systems would be considered scenery data.

Although this goes without saying, it is important to note that input data and output data do not need to be the same. Input data may be completely transformed or converted to a different form of expression or communication, and presented in a completely different or novel way.

Just one non limiting example might be the words of a book and the information therein might be presented in a completely different manner. Text information might be displayed as audio, audio information as visual, visual as haptic and even haptic back into written. Any transformation of one format or context to another and any combination or mix are considered within this disclosure.

IN addition, information input is not 1:1 with information outputted. The information presented might be an amendment or modification of the original data and or completely new data all related or unreleased data altogether.

as displaying one form of content in a completely different format or method.

Just one such non limiting example might be one type of data, say for example written information, displayed in a different format altogether as in the Mars example previously.

Any sort of substitution or of one type of information or method of communication to another type.

Information "visual, audio or haptic or smell information. Any sort of content transformation to a completely new method. This might be situations where the information is similar to the input information or contain completely unique or novel content apart from the input information.

This may include but is in no way limited to; Any content or interactions made available.

The recreation, reproduction, realization, rendering and or display of fictional people, objects, settings, world or otherworldly phenomenon, objects or settings.

This need not necessarily be a recreation of things found in the real world and may be completely novel or imaginative content.

The display information as a moving sequence of events or a narrative, which may occur in chronological or non-chronological order.

The progression or sequence of events could be character movement, speech, interactions, actions, a sequence of information about any objects, settings or characters. Any narrative or structure produced through computer graphics.

The display or retelling of any form of information whether it is displayed statically or dynamically Any communications passed on or outputted by the system.

Any movie like, or game like production.

The production where a story is told or information conveyed.

Any smell related information that is produced by the system.

Any audible information produced by the system.

Any haptic data or touch data outputted.

Visible and invisible light output

Any audible output

Any spoken words

The display of any movements including the movements of characters, objects or creative expressions The display of informational content either statically or dynamically.

Anything Rendered as computer graphics

Anything Output as audio or radio waves

Produced as an audio visual combination It may be;

A reproduction of one or more object

Shown as a story that progresses in the environment sequentially or non-chronologically Displayed as characters, locations, settings, realized narrative information Displayed as character movements actions or interactions Any data related to input data that is produced in an animated state, or a static visual representation Displayed as artistic information Displayed as information An audio soundtrack of musical composition that is related to the expressive work.

Displayed information about the narrative data

Statistical information

And visual or audible information that is displayed that is related to the expression content either directly or by extension.

Any User Interface Data

Any interactions made available, such as interactions made available to a system user or interactions made available between system users.

Any interactions enabled or made available to a user and his avatar by any scenery data or through directly and indirectly connected systems.

Any output that a user may experience that is produced by extension of the input data Outputted in these and other forms is known as scenery data.

The effect of this is greater than the sum of its parts, it is truly a marvel that is difficult to explain in words the emotional result the system is able to provide.

In the case of expressive works with narrative structure, this system provides a user the ability to interact with, experience and virtually live inside of "the world of the book".

And to use lay language for a minute, this is the systems number one aim, to

This might consist of the static display of information, the animated display of information, the progression of a plot in a realized audio visual manner, narrative or context in which that information is displayed.

This output data might be simple like the display of a static object to complex life like characters, settings and information.

The system has the capability of displaying characters and settings in a way you might experience them in a movie or in the real world.

These characters might speak, communicate, move, act, and interact in a very realistic way.

This may come in the form of fully realized narrative reproductions of stories, the progression of events related to the expressive work, the characters, settings and any information gathered through the input data and content of the expressive work.

For example, in the case of a book about the Industrial Revolution, a system may envelop the user in a scene showing workers working in a textile mill, which may then progress to showing the workers protesting for fair wages.

It may be supplementary content to a movie that is playing in the virtual environment.

If a user was reading a book about fixing a car, the relevant parts might be displayed and tools required.

A user that was reading a story about ancient Egypt, and might be able to see the pyramids as they are built.

An important point is that the system is not limited to showing a 1:1 representation of information or content within a book. Some embodiments may use a 1:1 synchronization between a system user's progression vis-à-vis the expressive content.

Chronological synchronization is an option for the system but the system may take other forms as well.

Depending on the processing and graphics power allotted, a system user in some embodiments might even find it hard to recognize the difference between real life and the created environment.

In some embodiments the use may explore or interact with the virtual environment. This result is allowing a user interact with the "world" of that story, and the people (characters) and "locations" created through the books content.

Let's use the example of a sci-fi novel. A user might be given a prompt to stop reading and interact with the data either himself or with several other avatars in an "adventure" style mode.

In the case of a post-apocalyptic book about underground bunkers or "silos" as is the case in the recent serialized novel "wool".

Readers might be able to put the book down and walk around the silo. Visit its various rooms. Speak with the residents of the silo, ask about the events related to the book and get responses about them.

The may interact with this environment with their own avatars or the characters themselves, taking on the physical appearance and voice qualities of that character.

This could take many forms.

The system user may interact with the elements of the environment.

A user might be able to interact with one or more builders, who is dressed like, acts like, and speaks like someone of the time period. The user may ask questions, have them respond with direct answers.

Furthermore, these inputs, analysis and outputs are not an isolated step process.

Interactions between these steps may produce recursive effects where a system user or an avatar('s) interactions with the output data, changes the input data, and by extension the resulting output.

This means that interactions with or changes to outputted scenery data by system users or their avatars relative to the system output may feedback into inputs and by extension changing the resulting output.

Let's take the example above where the user is given an opportunity to stop reading and to instead with the scenery data directly.

In the example of a working embodiment where the user is interacting with the world of the book, and the system user has is controlling the avatar who has taken the place of the "main character". The system user through interactions may actually change and progress the story line. The user may discover an object relevant to the story. They may learn or discover information from one of the story's characters. They may change and object or interact with the character or change the progression of events.

In some embodiments these changes the "world" will feed back into changes in the expressive work.

This is in some ways similar to "make your own adventure" style productions, except in this case it's more apt to say it's "live your own adventure"

A user's interactions with the "world of the book" might end up changing the book itself.

This is fully relevant for non-narrative embodiments. In those situations, interactions with three-dimensional informational constructs displayed within the system might change the information within the work providing that information.

So, in the example of mars in the augmented reality example above, a system user might be reading information about the history of the planet.

That user may get up from a chair and point to a specific section of the three-dimensional representation. As the user goes back to look at his text book, the data within has been update to a detailed description of that information.

In addition to interacting with the book, some embodiments will allow the system user to put the virtual book down, interact with the book or the characters around him. The system may allow the system user to either put down the book, and interact solely with the environment for a time. Examples of this would be a pop up to "join the battle", or "solve the puzzle" or "race the course" or "fly the plane".

In this way input data produces output data that produced modified input data based on a user's actions.

Output data could be information that is provided to physical feedback devices.

Scenery data could be provided to any number of feedback devices within a user environment. This could be smell generators to approximate the environment of the system user.

If a user is wearing input devices such as a "haptic suit", with feedback capabilities, the system could provide output information related to the scenery data.

A user could literally touch and feel the visual environment and the scenes described within the work.

May interact with characters through touch.

May smell scenery data through a device that outputs smell information and experience.

Through output to such feedback devices, the user may experience the environment with all five senses.

Output data is not limited to a single environment or changes to more than one separate environments.

Furthermore, it also consists of any output data sent to or collected by any external computing devices, systems, output systems or devices which might be directly or indirectly connected with the platform, such as systems that are separate from but connected in some way to the core platform.

This connection might take the form of coding API's or other publicly available APIs, which might allow external software companies or producers of hardware to interact with the system.

Examples of output mediums might be external displays, tablets or mobile devices, software programs, smart devices, smart lights, connected speaker systems, connected A/V systems, or any other system that is able to output information retrievable through the five senses or may provide interaction for a human being.

Just one specific non-limiting example might be Philip Smart lights. Let's is a hypothetical example where the scenery data is being displaying as a locale.

Within this locale,

The system may display output information through audio, visual, and other systems.

The system is not limited to being displayed on a single display the time. The system may make use of a multitude of directly and indirectly connected display and feedback systems.

This includes but is not limited to, fixed-display systems such as television or computer monitor, head mounted displays, tablet displays, holographic display systems, laser projection systems, clear glass display systems one example being a car window or projection into the human eye or through display implants, or any system that is a means for the projection of information as perceived by a human.

Augmented Reality (AR or MR) is one such possibility. Augmented reality allows the system to intermix the virtual environment and the user's real environment. As the word virtual environment is used throughout this disclosure, when the system displays a virtual environment within the space of a system user's real-world environment, then the real-world environment is considered part and parcel of the virtual environment.

Whereas in the virtual environment the dimensions in which the content and output information is project is recreated using computer graphics, in the Artificial reality examples, the dimensions of the user's real-world environment becomes the construct and structure in which the virtual environment exists.

In situations where the system uses augmented reality as a means for display, the user will be able to directly interact with the virtual environment and the content therein directly with his own body, or with the aid of other devices within the user's real world.

This provides the added benefit of allowing multiple system users to interact with one-another in their real-world environments. Two or more people in the same physical location, could interact with each other and the virtual environment through their physical presence.

A novel aspect of this system is the idea of "user is avatar".

User is avatar is one way the system enhances the immersion of a user into the virtual environment.

This could come in the form of the projection, display or visual augmentation over the user's body, accessories, clothes, and even handheld objects in relation to input data.

And another example might be somebody taking the place of a main character present within the input data. This system would be able to augment a user's physical appearance, voice, style of dress or any other personality or visual attributes over the physical body of the person within the virtual environment. This concept might be broadly applicable including outside of the platform described in this specific disclosure. It would also allow for the display or augmentation of physical objects that are being one body or carried by the physical person interacting with the environment. This user would then be able to see and hear himself as the main character in the story and so would other people that were perceiving information as produced by the system.

In combining this with multiple users in a physical space as described above.

You might have multiple people in a room playing different characters of a famous book or story or movie. Each character might choose a character in the story to "play or "be".

They see themselves and the other people in the physical space with them as those characters.

Any clothing accessories are objects that the characters might pick up and use are also displayed. Less use an example of two medieval swordsmen. The users would see each other and themselves with armor on and swords in their hands, these virtual objects, in this case the swords might be real physical objects, such as a stick, wherein a sword is augmented and depicted in place of the stick or physical object. This process may completely generate any new objects within the environment or augment any existing real-world physical objects, making them appear as some other object.

Some non-limiting examples might be a virtual dress up program which might allow someone to see what they look like with virtual cosmetics, or virtual clothing.

Any output data that the system may display in a fully virtual environment may also be displayed in the example of augmented reality;

The system may variously fill a user's entire field of view with virtual elements. It may alternatively mix-and-match real world or virtual objects, for example showing some real objects within the user space, while showing other objects as virtual objects.

As explained in the earlier example some real objects may be augmented to look like virtual objects. This is not limited to handheld objects and may be other objects within a user's physical space. For example, a couch that system users are sitting on may become a car seat, the scene becomes the seat of the car and around the couch a car is displayed, with one of the system users acting as a driver and the other acting as a passenger in a moving vehicle. Around the vehicle they may see the car moving within an animated scene.

In other examples physical devices acting as a means of input into the system. If the earlier example of a journalist with a typewriter is used, a system user might be sitting at a real desk with a real typewriter in front of him typing on a real or virtual piece of paper. In any case the system will be able to keep the typewriter and the system users within his or her field of view. Around the typewriter everything in the user's field of view could be a virtually generated scene in a full 360°.

In the same example, alternatively, the desk shown could be the real desk or other objects in the room could be real objects within that user's real physical space. Any combination of real or physical display or augmentation is possible in early compatible with the system and platform.

In no way should the means of display be used to limit anything stated in this disclosure, additionally the system would be able to adapt with and take advantage of the capabilities of any display or feedback system that produces output through the use of a processor.

Data Inputs range from system users' physical state when interacting with the work. Examples of inputs include any information gathered by physical sensors. These include those detecting body state such as heart rate, mind state such as EEG, location as gathered by GPS, movement and genetic data as gathered by visible or invisible light sensors, accelerometers, barometers or gyroscopic sensors.

Any information about a system user's avatar that may be tracked such as;

A myriad of embodiments may be combined. Input data points are collected about one or more people through a number of input and output devices.

The data points are gathered by various input, tracking and detection systems. Data points could be any information about one or more peoples current or past actions, interactions or state of being in the physical world.

Embodiments including;

A listing of all the different things that might make up input.

An embodiment where the input data is a user's heart rate is monitored in relation to his or her use of the system.

Wherein a means for capturing heart rate data is used. Non limiting examples for a means for capturing such information might be a fitness tracker or a portable ECG.

And embodiment where a system user's kinetic movements while interacting with the system is the input data.

Wherein a non-limiting means for capturing kinetic data may be capacitive touch platforms including those that might be walked on, visible or invisible light sensors and radio wave sensors.

An embodiment where the data input is a system user's eye position when interacting with the work or the content inside of it.

Wherein a nonlimiting means for capturing eye position on data is a retinal tracking device, to device that is integrated with a head mounted display, using EEG technology to track the signals of a user's visual cortex may be on other example of a means for determining location viewing location.

And embodiment where input data is a user's brain signals.

Where in a non-limiting means for capturing brain signals might be an ECG device that a user wears on their head.

An embodiment with the system tracks one or more users interacting with each other.

An embodiment where

Input Data May be gathered from a plethora of outside Devices, sources, databases directly or indirectly, via connections and interconnections with the system.

This may use an API to allow third-party developers to integrate with the system, or may be the system interconnecting with outside devices and online databases to retrieve out.

A multitude of information about the virtual world the elements of it including avatar actions, interactions, and even the output data itself might be taken into consideration An embodiment where input data is interactions between avatars.

An embodiment where input data are the past or future achievements or the current status of one or more avatars.

Information on the state of the and information about the virtual environment and its system users in relation to the book are tracked not limited to the following;

An embodiment where the number of users interacting with the worker works is considered as input data.

An embodiment where the number of users interacting with the work is input data

An embodiment Wherein the input data is related to the punitive time since one of more users has interacted with the work An embodiment wherein the input data is the current location with an environment the work resides.

An embodiment wherein there is multiple environments simultaneously existing. in such an embodiment it may be useful to use information related to which environment the book exists and use that monitored information as input data.

An embodiment wherein the feedback device is a small generator.

Embodiment wherein the feedback device is a connected light system

An embodiment wherein the feedback device is a smart appliance.

Additional capabilities add can be myriad but examples such as transforming a book into a completely different shape or form, projecting system user interfaces from them or allowing unusual interactions such as the ability to control the book using thoughts, using the object to control other objects or content within the environment, displaying different forms of multimedia within the work even though the reproduction is of a paper book.

The expressions or communications are not stuck inside the one virtual object. The book may completely separate from the object itself, for example with the words displaying in a different location or floating in space within the environment. transmitting the content of one work to another work, transmitting the object to another virtual world or environment, copying the work to create duplicates or sharing the work with other avatars by copying it In embodiment one electronic book is the virtual work.

Shopping Experience

In some embodiments, the book would be select by or received from a virtual bookstore. The bookstore might be represented with in the virtual world itself. In this embodiment a system user would be displayed an interface where he could browse, read and purchased books. This interface could either be 2D or full 3D interface such as a replication of the real-world bookstore.

In the latter example, a system user would be able to walk around within the real-world bookstore, to browse the shelves, to pick a book from off-the-shelf, preview and read the book, go over to the cash register to see the attendant and/or librarian, ask questions, purchase and/or borrow the book and perform other interactions consistent with but not limited to the kind of interactions available to a human being within a real-world bookstore. Some interactions not available within the real might be possible such as pointing or pressing though the use of an avatar in a certain location to bring up a floating 2D interface showing supplementary information.

Information within this floating had or pop up exists within the 3D shopping environment and can be interacted with while continuing to browse the reproduction of the 3D environment. This would provide an enhance experience allowing system users to leave reviews of a chosen book, to bring up a display showing information from other online and off-line sources. So, in this manner a system user would be able to navigate a replicated emulation of a real-world bookstore or library instantly be able to bring up information within this 3D interface that would be consistent with the kinds of information available on an online bookstore such as Amazon.com or barnesandnoble.com.

Providing a virtual object within the environment. The inceptive attributes of the 3D environment may be related to the work or may alternatively be unrelated to it.

Selecting or receiving the book vis-à-vis the virtual environment might occur in various ways.

In a situation where a book is selected before the environments creation, it is possible for the system to analyze the contents of the work before creating the environment or anytime thereafter.

There is no chicken or an egg issue, they could be separate or connected from the beginning, and either is sufficient for a working platform.

Other options might be starting with a featureless environment with or without a work in it, a random work in it, a related environment or an unrelated environment.

Methods of receiving the work might be variously through,

An e-commerce platform either within the virtual environment or externally of the virtual environment, such as external devices displays systems and software and online stores.

Note regarding extra figures.

Figure 2:
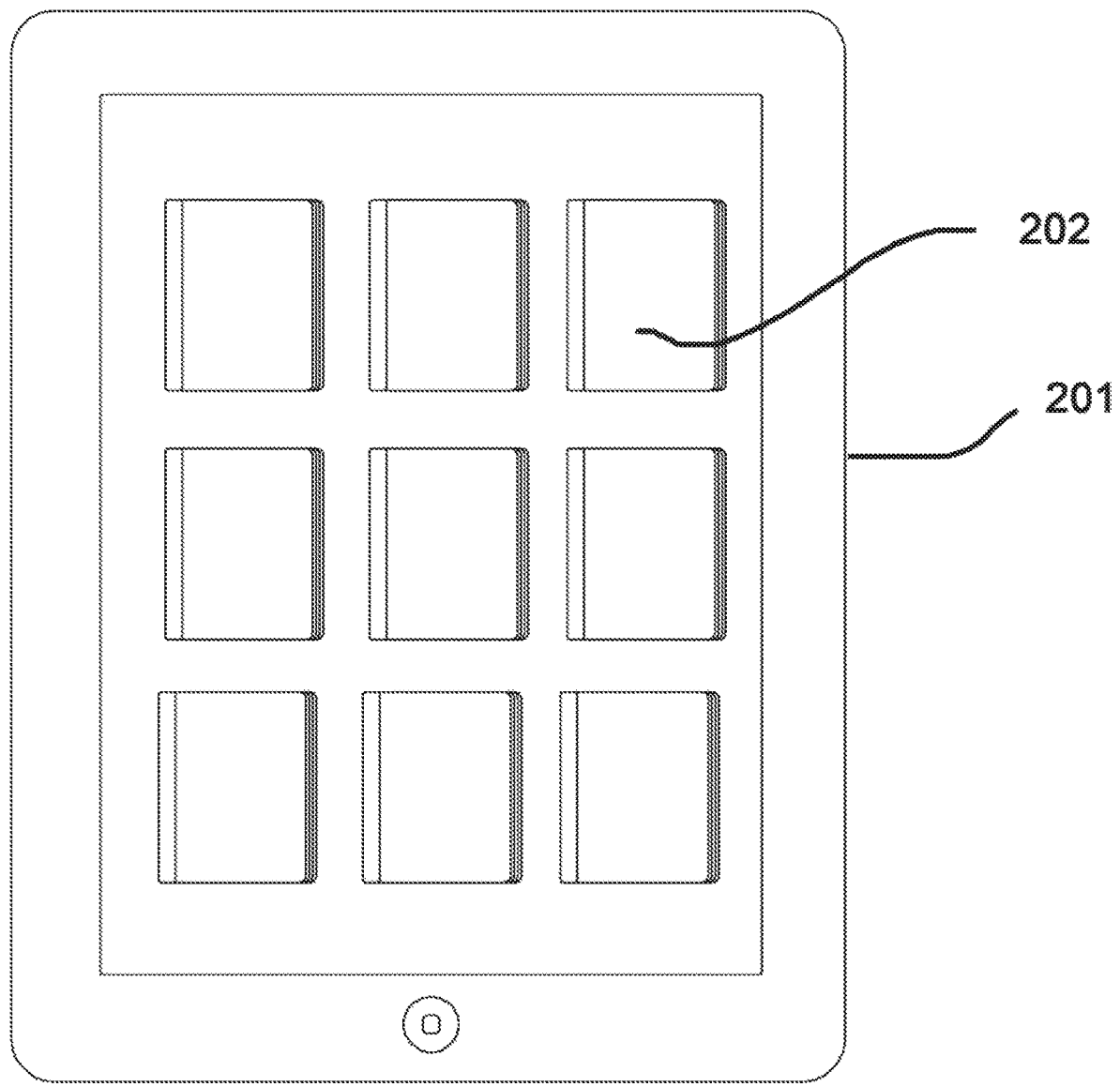
FIG. 2 shows a book selected on an external device, according to embodiments of the invention.

FIG. 2 shows a book selected on an external device, in this fig, and iPad is shown.

FIG. 2 201, FIG. 2 202 shows a book being selected from a personal library.

It will be understood that there are numerous modifications of the illustrated embodiments described above which will be readily apparent to one skilled in the art, including any combinations of features disclosed herein that are individually disclosed or claimed herein. These modifications and/or combinations fall within the art to which this invention relates and are intended to be within the scope of the claims, which follow. It is noted, as is conventional, the use of a singular element in a claim is intended to cover one or more of such an element.

What is claimed is:

1. A system for displaying an environment, the system comprising:
    a computer processor;
    a head-mounted display including a tracking device operable to track a user's reading position; and
    a content engine executing on the computer processor and configured to:
        display at least a portion of a virtual three-dimensional environment in the head-mounted display;
        enable a user to interact with the virtual three-dimensional environment;
        display a virtual representation of a written work within the virtual three-dimensional environment in the head-mounted display;
        enable the user to interact with the virtual representation of the written work;
        receive the user's reading position in the representation of the written work from the tracking device;
        identify the content of the representation of the written book at the user's reading position; and
        modify the virtual three-dimensional environment based at least in part on the content at the user's reading position, wherein modifying includes producing a visual representation of a character described in the written work, and wherein the visual representation of the character speaks at least a portion of the written work corresponding to the user's reading position.

2. The system of claim 1, wherein:
    the content engine is further configured to access a set of resources that provide contextual information associated with the content of the representation of the written book at the user's reading position; and
    modifying the virtual three-dimensional environment is based at least in part on the contextual information.

3. The system of claim 2, wherein the set of resources comprises at least one selected from a group consisting of an Internet website, encyclopedia, research database, patent, government database, dictionary, periodical, magazine, and newspaper.

4. The system of claim 1, wherein producing the visual representation of the character includes representing the character acting in chronological sync with the content of the representation of the written book at the user's reading position.

5. The system of claim 1, wherein the character speaks in chronological sync with the content of the representation of the written book at the user's reading position.

6. The system of claim 1, wherein the virtual three-dimensional environment comprises an avatar, wherein the avatar is based on a character included in the written work.

7. The system of claim 1, wherein the tracking device comprises at least one selected from a group consisting of a camera, infrared camera, and EEG sensor.

8. The system of claim 1, wherein the written work comprises at least one selected from a group consisting of a book, journal, work of literature, work of expression, sheet music, text document.

9. A method for displaying an environment, the method comprising:
displaying at least a portion of a virtual three-dimensional environment in a head-mounted display, wherein the head-mounted display includes a tracking device operable to track a user's reading position;
enabling a user to interact with the virtual three-dimensional environment;
displaying a virtual representation of a written work within the virtual three-dimensional environment in the head-mounted display;
enabling the user to interact with the virtual representation of the written work;
receiving the user's reading position in the representation of the written work from the tracking device;
identifying the content of the representation of the written book at the user's reading position; and
modifying, by a computer processor, the virtual three-dimensional environment based at least in part on the content at the user's reading position, wherein modifying includes producing a visual representation of a character described in the written work, and wherein the visual representation of the character speaks at least a portion of the written work corresponding to the user's reading position.

10. The system of claim 9:
further comprising accessing a set of resources that provide contextual information associated with the content of the representation of the written book at the user's reading position; and
wherein modifying the virtual three-dimensional environment is based at least in part on the contextual information.

11. The system of claim 10, wherein the set of resources comprises at least one selected from a group consisting of an Internet website, encyclopedia, research database, patent, government database, dictionary, periodical, magazine, and newspaper.

12. The system of claim 9, wherein producing the visual representation of the character includes representing the character acting in chronological sync with the content of the representation of the written book at the user's reading position.

13. The system of claim 9, wherein the character speaks in chronological sync with the content of the representation of the written book at the user's reading position.

14. The system of claim 9, wherein the virtual three-dimensional environment comprises an avatar, wherein the avatar is based on a character included in the written work.

15. The system of claim 9, wherein the tracking device comprises at least one selected from a group consisting of a camera, infrared camera, and EEG sensor.

16. The system of claim 9, wherein the written work comprises at least one selected from a group consisting of a book, journal, work of literature, work of expression, sheet music, text document.

17. A non-transitory computer-readable storage medium comprising a plurality of instructions for displaying an environment, the plurality of instructions configured to execute on at least one computer processor to enable the at least one computer processor to:
display at least a portion of a virtual three-dimensional environment in a head-mounted display, wherein the head-mounted display includes a tracking device operable to track a user's reading position;
enable a user to interact with the virtual three-dimensional environment;
display a virtual representation of a written work within the virtual three-dimensional environment in the head-mounted display;
enable the user to interact with the virtual representation of the written work;
receive the user's reading position in the representation of the written work from the tracking device;
identify the content of the representation of the written book at the user's reading position; and
modify the virtual three-dimensional environment based at least in part on the content at the user's reading position, wherein modifying includes producing a visual representation of a character described in the written work, and wherein the visual representation of the character speaks at least a portion of the written work corresponding to the user's reading position.

18. The non-transitory computer-readable storage medium of claim 17, wherein:
the plurality of instructions are configured to execute on the at least one computer processor to further enable the at least one computer processor to access a set of resources that provide contextual information associated with the content of the representation of the written book at the user's reading position; and
modifying the virtual three-dimensional environment is based at least in part on the contextual information.

19. The non-transitory computer-readable storage medium of claim 17, wherein producing the visual representation of the character includes representing the character acting in chronological sync with the content of the representation of the written book at the user's reading position.

20. The non-transitory computer-readable storage medium of claim 17, wherein the character speaks in chronological sync with the content of the representation of the written book at the user's reading position.

* * * * *

UNITED STATES PATENT AND TRADEMARK OFFICE
CERTIFICATE OF CORRECTION

| | |
|---|---|
| PATENT NO. | : 11,302,084 B2 |
| APPLICATION NO. | : 17/063635 |
| DATED | : April 12, 2022 |
| INVENTOR(S) | : Stephen Constantinides |

It is certified that error appears in the above-identified patent and that said Letters Patent is hereby corrected as shown below:

On the Title Page

(71) Applicant Should read: You Map Inc., New York, NY (US)

Signed and Sealed this
Seventh Day of June, 2022

*Katherine Kelly Vidal*

Katherine Kelly Vidal
*Director of the United States Patent and Trademark Office*